United States Patent
Kamitani (10) Patent No.: US 10,752,101 B2
(45) Date of Patent: Aug. 25, 2020

(54) STRUCTURE OF ATTACHING WEATHER STRIP

(71) Applicant: Nishikawa Rubber Co., Ltd., Hiroshima (JP)

(72) Inventor: Yoshihiko Kamitani, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 172 days.

(21) Appl. No.: 16/056,408

(22) Filed: Aug. 6, 2018

(65) Prior Publication Data

US 2019/0047391 A1    Feb. 14, 2019

(30) Foreign Application Priority Data

Aug. 10, 2017  (JP) ................... 2017-155458

(51) Int. Cl.
| | |
|---|---|
| *E06B 7/16* | (2006.01) |
| *B60J 10/86* | (2016.01) |
| *B60J 10/15* | (2016.01) |
| *B60J 10/23* | (2016.01) |
| *B60J 10/27* | (2016.01) |
| *B60J 10/24* | (2016.01) |
| *B60J 10/35* | (2016.01) |

(52) U.S. Cl.
CPC ............ *B60J 10/86* (2016.02); *B60J 10/15* (2016.02); *B60J 10/23* (2016.02); *B60J 10/24* (2016.02); *B60J 10/27* (2016.02); *B60J 10/35* (2016.02)

(58) Field of Classification Search
CPC ... B60J 10/86; B60J 10/35; B60J 10/24; B60J 10/27; B60J 10/23; B60J 10/15; B60J 10/85

USPC .............................. 49/495.1, 498.1
See application file for complete search history.

(56) References Cited

U.S. PATENT DOCUMENTS

| | | | | |
|---|---|---|---|---|
| 4,114,320 A | * | 9/1978 | Pullan ................ | B60J 10/22 428/122 |
| 5,367,830 A | * | 11/1994 | Omura ............... | B60J 10/30 49/475.1 |
| 2007/0199247 A1 | * | 8/2007 | Oba .................. | B60J 10/24 49/498.1 |
| 2007/0245634 A1 | * | 10/2007 | Oba .................. | B60J 10/248 49/498.1 |
| 2010/0077672 A1 | * | 4/2010 | Nozaki ............... | B60J 10/24 49/483.1 |
| 2015/0210219 A1 | * | 7/2015 | Watanabe ........... | B60R 13/04 280/163 |

(Continued)

FOREIGN PATENT DOCUMENTS

| | | | | |
|---|---|---|---|---|
| DE | 3246577 A1 | * | 6/1984 | ........ B60J 10/35 |
| DE | 4318719 A1 | * | 12/1993 | ........ B60J 10/32 |

(Continued)

*Primary Examiner* — Jerry E Redman
(74) *Attorney, Agent, or Firm* — Renner, Otto, Boisselle & Sklar, LLP (57) ABSTRACT

A double-sided adhesive tape is provided on a hollow seal portion. A door frame includes an sticking surface, and a protruding portion protruding and provided on an outer side of a passenger compartment than the sticking surface. An attachment base portion includes a solider portion than the seal lip portion, and the solider portion includes a fitting portion 12c fitted to the protruding portion. A deformation origin portion is provided between the hollow seal portion and the attachment base portion.

6 Claims, 6 Drawing Sheets

(56) References Cited

U.S. PATENT DOCUMENTS

| | | | |
|---|---|---|---|
| 2018/0009299 A1* | 1/2018 | Sugawa | B60J 10/36 |
| 2018/0154751 A1* | 6/2018 | Berndt | B60J 10/45 |
| 2018/0312049 A1* | 11/2018 | Slinger | B60J 7/141 |
| 2019/0031004 A1* | 1/2019 | Kanphade | B60J 10/86 |
| 2019/0047391 A1* | 2/2019 | Kamitani | B60J 10/23 |
| 2019/0176602 A1* | 6/2019 | Takeda | B60J 10/88 |
| 2019/0193542 A1* | 6/2019 | Prodoni | B60J 10/36 |

FOREIGN PATENT DOCUMENTS

| | | | |
|---|---|---|---|
| EP | 0679547 A1 * | 11/1995 | B60J 10/84 |
| JP | 2001163062 A * | 6/2001 | B60J 10/35 |
| JP | 2004-17874 A | 1/2004 | |

* cited by examiner

STRUCTURE OF ATTACHING WEATHER STRIP

CROSS-REFERENCE TO RELATED APPLICATION

This application claims priority to Japanese Patent Application No. 2017-155458 filed on Aug. 10, 2017, the entire disclosure of which is incorporated by reference herein.

BACKGROUND

The present invention relates to a structure of attaching a weather strip for a door of an automobile to the door.

A typical weather strip for sealing a gap between a peripheral edge portion of a door of an automobile and an opening portion of a vehicle body is attached to a door (see, e.g., Japanese Unexamined Patent Publication No. 2004-17874). FIG. 1 of Japanese Unexamined Patent Publication No. 2004-17874 discloses a weather strip which includes a hollow seal portion located on an inner side of a passenger compartment and also includes an attachment base portion integrated with the hollow sealing portion at outer side of the passenger compartment. A seal lip portion is also integrated with the attachment base portion. The hollow seal portion and the seal lip portion are elastically deformed by coming into contact with a vehicle body panel when the door is in a closed state, so as to serve to seal the gap between the peripheral edge portion of the door and the opening portion of the vehicle body. The attachment base portion includes a lower surface having a recessed portion into which a raised portion formed on a door frame is fitted. The raised portion is fitted to the recessed portion such that the outer side of the passenger compartment of the weather strip, i.e., the attachment base portion is positioned with respect to the door frame. On the other hand, the hollow seal portion 11 includes a lower surface on which a double-sided adhesive tape T is provided. This double-sided adhesive tape T is stuck on the door frame such that the inner side of the passenger compartment of the weather strip, i.e., the hollow seal portion is attached to the door frame.

FIG. 2 of Japanese Unexamined Patent Publication No. 2004-17874 discloses a weather strip which includes a hollow seal portion located on an inner side of a passenger compartment and also includes an attachment base portion having a seal lip portion. The hollow seal portion and the attachment base portion are configured as different parts.

SUMMARY

In the structure disclosed in FIG. 2 of Japanese Unexamined Patent Publication No. 2004-17874, the hollow seal portion and the attachment base portion are configured as different parts so that the number of parts increases. Thus, the number of steps required for the attachment also increase. Thus, as disclosed in FIG. 1 of Japanese Unexamined Patent Publication No. 2004-17874, the structure in which the hollow seal portion and the attachment base portion having the seal lip portion are integrated together and the attachment base portion is stuck with a double-sided adhesive tape may be preferable.

If the hollow seal portion and the attachment base portion are integrated together, the attachment to the door frame may be an issue. That is, in the structure in which the attachment base portion is stuck with the double-sided adhesive tape, the double-sided adhesive tape with which the attachment base portion is stuck has to be peeled off to adjust the sticking position if the sticking position is misplaced from a normal position. At that time, the attachment base portion may be damaged, or the double-sided adhesive tape may be unable to be reused such that the replacement is required. Thus, the operation becomes complicated.

Thus, it is conceivable that the attachment base portion is positioned with respect to the door frame before the hollow seal portion is stuck with the double-sided adhesive tape. Thereafter, the double-sided adhesive tape is stuck with reference to the attachment base portion. Specifically, in the structure of FIG. 1 of Japanese Unexamined Patent Publication No. 2004-17874, the recessed portion is formed on the lower surface of the attachment base portion. Thus, the attachment base portion can be positioned by fitting the raised portion of the door frame to the recessed portion.

However, the attachment base portion needs to be integrated with the seal lip portion, and thus is composed of an elastic material. Thus, even if the raised portion of the door frame is fitted into the recessed portion, the vicinity of the recessed portion in the attachment base portion is easily elastically deformed. Thus, the position of the attachment base portion is displaced, and the hollow seal portion may be stuck in a misplaced position. If the sticking positions of the attachment base portion and the hollow seal portion are displaced in the vehicle width direction (the inward-outward direction of the passenger compartment), the weather strip is in a meandering state. Thus, the appearance is deteriorated, and a sealing defect is caused.

A resin part called a garnish may be attached to the door frame. In this case, it is conceivable that a part of the weather strip is brought into contact with the resin part to determine the position. However, at this time, the resin part serving as a reference may rattles, or variations in assembly of the resin part to the door frame may be caused. Thus, the position of the weather strip is unlikely to be determined at the normal position. This also causes meandering of the weather strip.

Further, if the part of the weather strip is brought into contact with the resin part, the part of the weather strip might be elastically deformed and override the resin part. That is, the attachment itself of the weather strip to the normal position is difficult.

In view of the foregoing, it is an object of the present invention to improve the workability of attachment of the weather strip and increase the accuracy of the attachment position if the hollow seal part is integrated with the attachment base part having the seal lip part so that the number of parts of the weather strip is reduced.

To achieve the object, in the present invention, the fitting portion of the attachment base portion fitted to the door frame is solider than the seal lip portion such that the attachment base portion can be more accurately positioned with respect to the door frame. Further, a deformation origin portion is provided between the attachment base portion and the hollow seal portion such that the hollow seal portion can be accurately and easily stuck to a predetermined position after the attachment base portion is positioned.

A first aspect of the present invention is directed to a structure of attaching a weather strip for a door to a door frame, the weather strip being provided on a peripheral edge portion of a door of an automobile, and made of an elastic material and sealing a gap between the peripheral edge portion of the door and a peripheral edge portion of an opening portion of a vehicle body. The weather strip is formed by integrating a hollow seal portion and an attachment base portion together. The hollow seal portion is elastically deformed by coming into contact with the peripheral edge portion of the opening portion of the vehicle body.

The attachment base portion includes a seal lip portion disposed on an outer side of a passenger compartment of the hollow seal portion and elastically deformed by coming into contact with the peripheral edge portion of the opening portion of the vehicle body on an outer side of the passenger compartment than the hollow seal portion, and is disposed on an outer side of the passenger compartment than the hollow seal portion. A sticking material is provided on a surface of the hollow seal portion closer to the door frame. The door frame includes a sticking surface on which the sticking material is stuck, and a protruding portion protruding and provided on an outer side of the passenger compartment than the sticking surface. The attachment base portion includes a portion composed of a solider material than the seal lip portion. This solider portion includes a fitting portion fitted to the protruding portion. A deformation origin portion serving as an origin of deformation is provided between the hollow seal portion and the attachment base portion of the weather strip.

According to this configuration, the hollow seal part is integrated with the attachment base part having the seal lip part, and thus the number of parts of the weather strip can be reduced. In attaching this weather strip, the fitting portion of the attachment base portion is fitted to the protruding portion of the door frame such that the attachment base portion is positioned with respect to the door frame. At this time, the fitting portion of the attachment base portion is solider than the seal lip portion. Thus, the seal lip portion is sufficiently soft so that the followability to the peripheral edge portion of the opening portion of the vehicle body is improved, and the deformation of the fitting portion is reduced such that the attachment base portion is more accurately positioned with respect to the door frame. Thus, the meandering of the weather strip 1 in the attached state is reduced.

Further, the deformation origin portion is provided between the hollow seal portion and the attachment base portion. Thus, even if the fitting portion of the base attachment portion is solid, the hollow seal portion can be easily displaced in a reverse direction with respect to the door frame in a state in which the attachment base portion is positioned. Thus, a release paper of the sticking material can be easily peeled off. Then, after the release paper is peeled off, the hollow seal portion is moved toward the door frame so that the sticking material is stuck to the sticking surface of the door frame. Accordingly, the hollow seal portion is attached to the door frame. Thus, the workability of attachment of the weather strip can be improved.

In a second aspect of the present invention, the door frame includes a door frame body and a trim strip member fixed to the door frame body and extending along the door frame body. The protruding portion is provided on the trim strip member.

According to this configuration, the trim strip member enhances the design of the door frame. The fitting portion of the attachment base portion of the weather strip can be fitted to the trim strip member.

In a third aspect of the present invention, the fitting portion of the attachment base portion is a groove into which the protruding portion is inserted. The protruding portion protrudes from an inner side of the passenger compartment of the trim strip member toward an outside of the door frame.

According to this configuration, the protruding portion protrudes toward the outside of the door frame. Thus, the protruding portion being inserted into the groove of the attachment base portion is less likely to come off from the groove.

In a fourth aspect of the present invention, the deformation origin portion is thinner than the attachment base portion.

According to this configuration, the deformation origin portion can be easily formed. In addition, the hollow seal portion can be displaced with respect to the attachment base portion with a small force.

In a fifth aspect of the present invention, the seal lip portion is composed of a foamed material. The fitting portion is composed of a non-foamed material.

According to this configuration, the seal lip portion is light and flexible. In addition, the fitting portion is made solid such that the attachment base portion is more accurately positioned.

In a sixth aspect of the present invention, the attachment base portion is provided with an engaging portion engaging with the door frame on an outer side of the passenger compartment than the fitting portion. The engaging portion includes a portion composed of a solider material than the seal lip portion.

According to this configuration, an outer side of the passenger compartment of the attachment base portion engages with the door frame through the engaging portion. At this time, the engaging portion includes a portion composed of a solider material than the seal lip portion. Thus, the engaging portion is less likely to come off from the door frame.

According to the first aspect of the present invention, the hollow seal part is integrated with the attachment base part having the seal lip part, and thus the number of parts of the weather strip can be reduced. Then, the fitting portion of the attachment base portion fitted to the protruding portion of the door frame is solider than the seal lip portion, and thus the accuracy of the attachment position of the weather strip can be increased. Further, the deformation origin portion is provided between the hollow seal portion and the attachment base portion. Thus, even if the fitting portion of the attachment base portion is solid, the operation of sticking the hollow seal portion to the sticking surface of the door frame though the sticking material can be facilitated. Thus, the workability of attachment of the weather strip can be improved.

According to the second aspect of the present invention, the protruding portion is provided on the trim strip member fixed to the door frame body. Thus, the fitting portion of the attachment base portion of the weather strip can be fitted to the trim strip member which enhances the design of the door frame.

According to the third aspect of the present invention, the fitting portion of the attachment base portion is configured as a groove, and the protruding portion protrudes from the inner side of the passenger compartment of the trim strip member toward the outside of the door frame. Thus, the protruding portion being inserted into the groove of the attachment base portion is less likely to come off from the groove, and thus the fitted state can be maintained.

According to the fourth aspect of the present invention, the deformation origin portion is thinner than the attachment base portion. Thus, the deformation origin portion can be easily formed, and the hollow seal portion can be displaced with respect to the attachment base portion with a small force.

According to the fifth aspect of the present invention, the seal lip portion is composed of a foamed material, thereby being light and flexible. In addition, the fitting portion is composed of a non-foamed material, and thus the accuracy of positioning of the attachment base portion can be improved.

According to the sixth aspect of the present invention, the engaging portion engaging with the door frame is provided on an outer side of the passenger compartment than the fitting portion, and the engaging portion includes a portion composed of a solider material than the seal lip portion. Thus, the outer side of the passenger compartment of the attachment base portion can be reliably engaged with the door frame.

DETAILED DESCRIPTION

Embodiments of the present invention will be described in detail below with reference to the drawings. Note that the following description of embodiments is merely examples in nature, and is not intended to limit the scope, application, or uses of the present invention.

Figure 1:
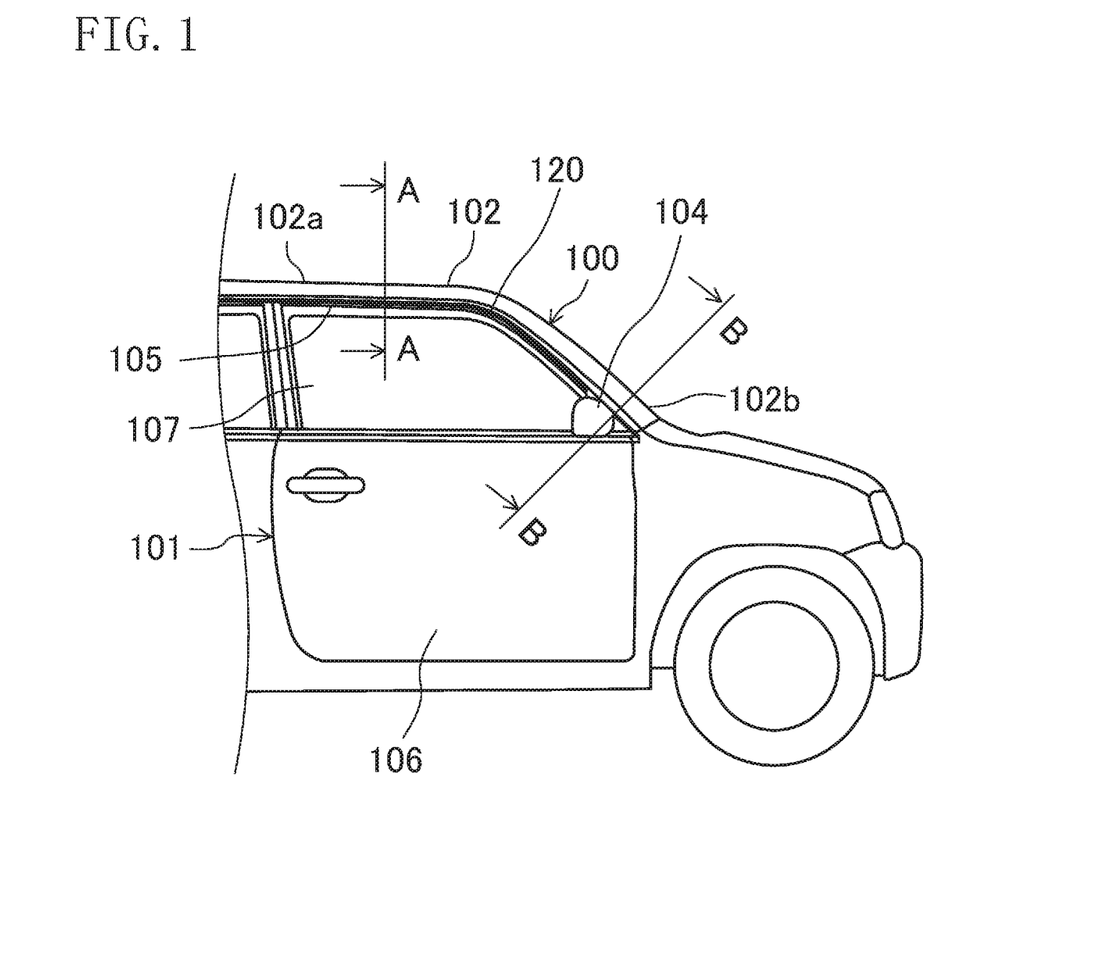
FIG. 1 is a right side view of a front side of an automobile according to an embodiment.

FIG. 1 is a right side view of a front side of an automobile 100 to which a weather strip attachment structure according to an embodiment of the present invention is applied. This automobile 100 includes doors 101 provided on the right side portion and the left side portion (not shown). The door 101 is a member for opening and closing an opening portion 103 (shown in FIG. 2) formed on a vehicle body 102. In this embodiment, the door 101 provided on the front and right sides of the vehicle body 102 will be described whereas a door (not shown) having a different shape but a similar structure can be provided also on the rear side or the left side of the vehicle body 102.

Figure 2:
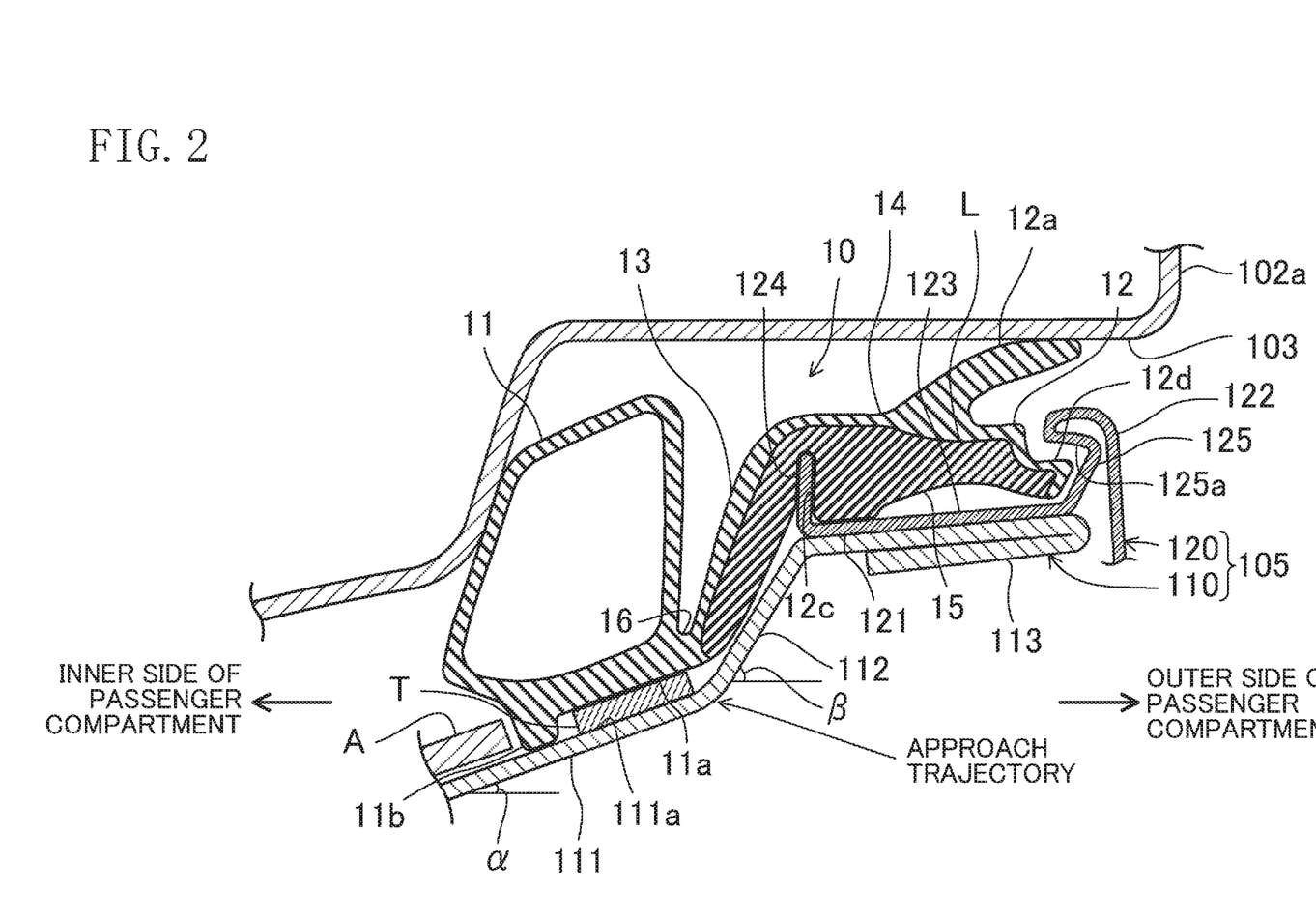
FIG. 2 is a cross-sectional view taken along the line A-A in FIG. 1.
Figure 3:
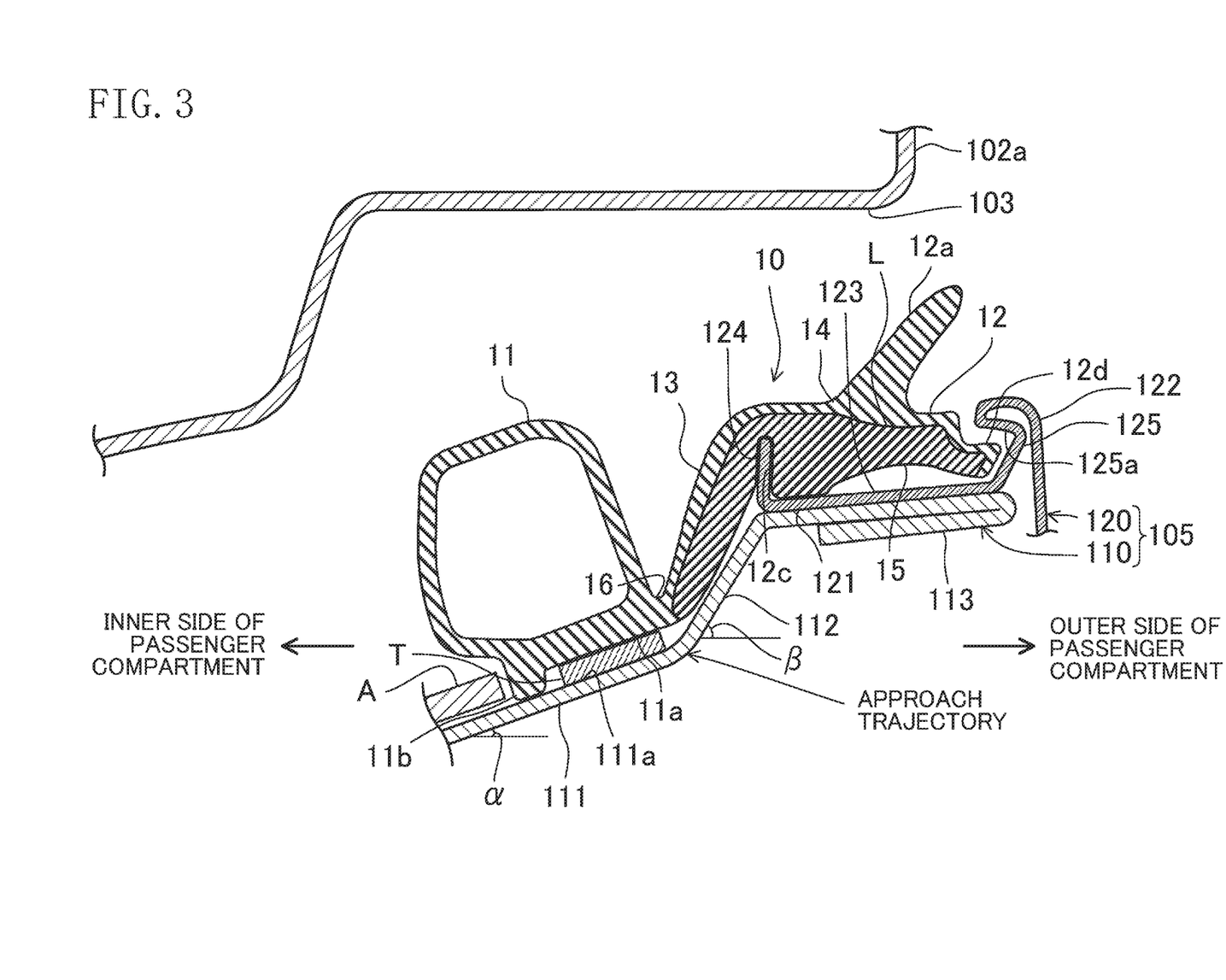
FIG. 3 is a view corresponding to FIG. 2 with the door slightly opened.
Figure 4:
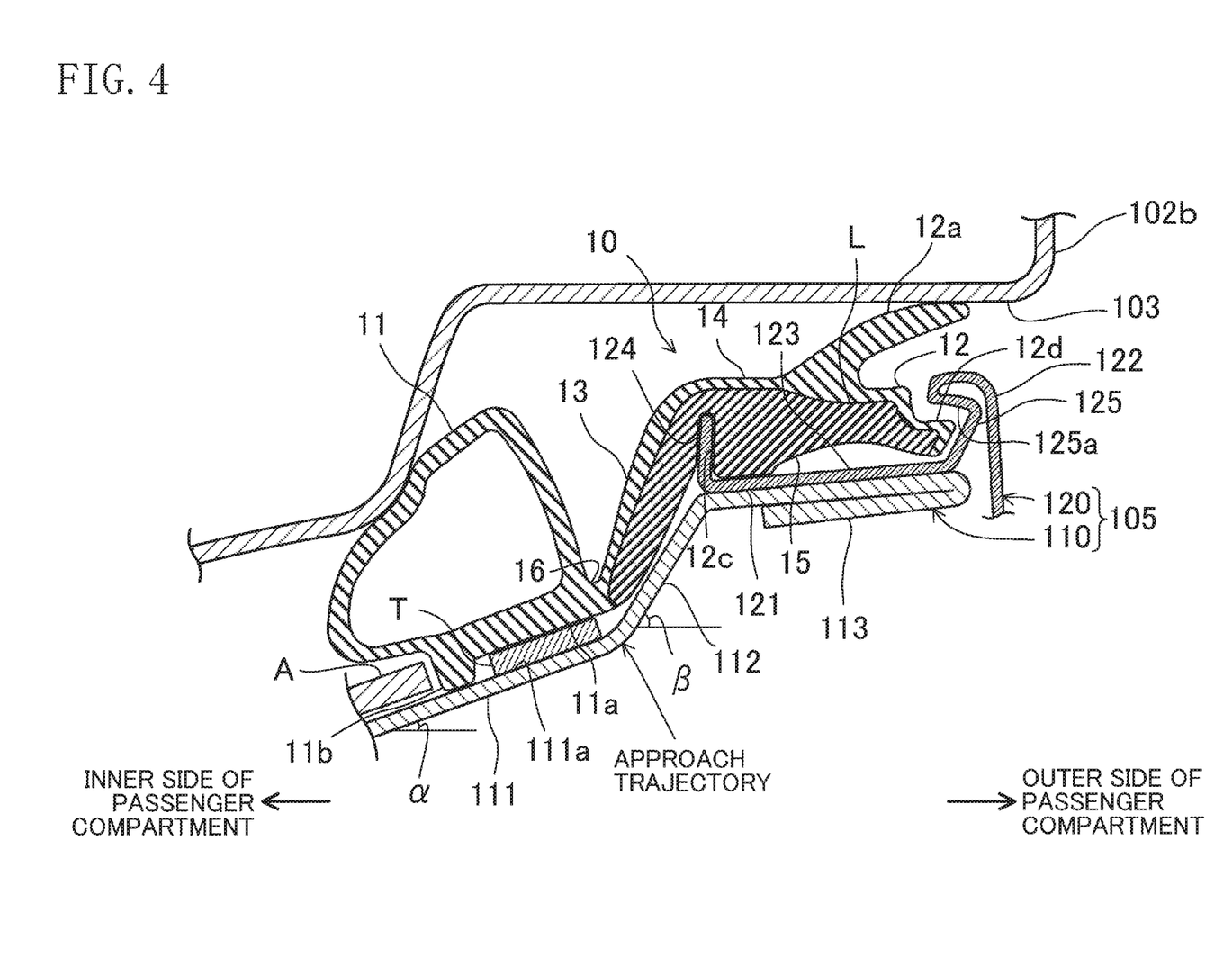
FIG. 4 is a cross-sectional view taken long the line B-B in FIG. 1.
Figure 5:
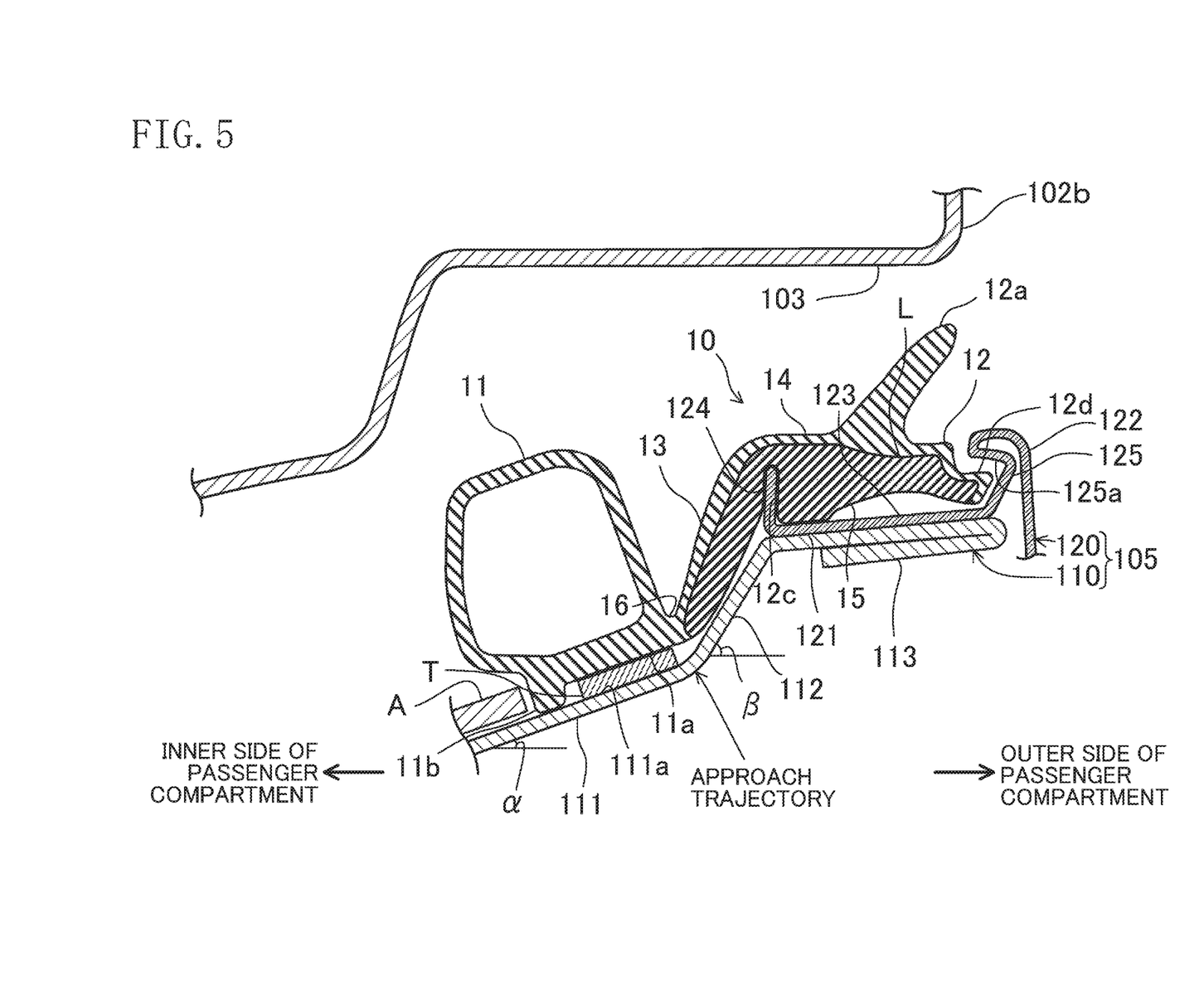
FIG. 5 is a view corresponding to FIG. 4 with the door slightly opened.

The vehicle body 102 includes at least a roof portion 102a constituting a roof of the automobile 100, and a door mirror vicinity portion 102b near a door mirror 104. The roof portion 102a extends in the front-rear direction of the vehicle and also extends in the inward-outward direction of the passenger compartment (the vehicle width direction). FIGS. 2 and 3 are cross sections corresponding to the roof portion 102a of the vehicle body 102, and FIGS. 4 and 5 are cross sections corresponding to the door mirror vicinity portion 102b of the vehicle body 102. The cross section corresponding to the roof portion 102a and the cross section corresponding to the door mirror vicinity portion 102b are almost the same, but different as to the approach trajectory of the door frame 105 of the door 101 at the time of opening and closing.

Note that in the description of this embodiment, for the sake of convenience of the description, the front side of the vehicle is simply referred to as "front," the rear side of the vehicle is simply referred to as "rear," the right side of the vehicle is simply referred to as "right," and the left side of the vehicle is simply referred to as "left."

(Configuration of Door 101)

As shown in FIG. 1, the door 101 includes a door body portion 106 forming almost a lower half of the door 101, a door frame 105 forming almost an upper half of the door 100, and a door glass 107. Although not shown, the door body portion 106 houses a rail for holding and allowing the door glass 107 to be freely lifted and lowered, a window regulator for raising and lowering the door glass 107, and the like. The door body portion 106 includes a front end portion provided with a hinge mechanism (not shown) having a pivotal shaft extending in the vertical direction. The door 101 pivots on this pivotal shaft to switch between a closed state shown in FIGS. 1, 2 and 4 and an open state shown in FIGS. 3 and 5. FIGS. 3 and 5 shows that the door 101 is slightly opened, and the door 101 can be opened beyond the degree of opening shown in FIGS. 3 and 5.

In FIGS. 3 and 5, the door 101 has the same degree of opening. FIG. 3 is a cross section corresponding to the roof portion 102a, and FIG. 5 is a cross section corresponding to the door mirror vicinity portion 102b. As shown in these figures, even if the door 101 has the same degree of opening, the relative positional relation between the vehicle body 102 and the door frame 105 is different.

The door frame 105 is a member for holding a peripheral edge portion of the door glass 107, is provided to protrude upward from the door body portion 106, and is fixed to the door body portion 106. The door frame 105 can also be called a sash.

The door frame 105 extends in the front-rear direction along the roof portion 102a of the vehicle body 102, and the front side of the door frame 105 extends to the door mirror vicinity portion 102b of the vehicle body 102. The door mirror 104 is attached to the front side of the door frame 105.

As shown in FIG. 2, the door frame 105 includes a door frame body 110 and a trim strip member 120 fixed to the door frame body 110 and extending along the door frame body 110. The door frame body 110 is formed in a frame shape extending along the peripheral edge portion of the door glass 107. On the other hand, the trim strip member 120 is an elongated member extending in the front-rear direction along an upper edge portion of the door frame body 110. The door frame body 110 and the trim strip member 120 can be made of metal materials, and the metal member constituting the trim strip member 120 is different from the metal material constituting the door frame body 110. The metal member constituting the trim strip member 120 is preferably a shine metal material to have a design. That is, the trim strip member 120 can be a light trim strip.

As shown in FIG. 2, the door frame body 110 includes an inclined plate portion 111 on an inner side of the passenger compartment, a middle inclined plate portion 112, and a plate portion 113 on the outer side of the passenger compartment. The inclined plate portion 111, the middle inclined plate portion 112, and the plate portion 113 can be obtained by pressing a plate material such as a steel plate. The inclined plate portion 111 extends from the inner side of the passenger compartment toward the outer side of the passenger compartment of the door frame body 110, and is inclined upward on the outer side of the passenger compartment. The inclined plate portion 111 includes an upper surface serving as a sticking surface 111a on which a double-sided adhesive tape T described later is stuck. This sticking surface 111a is also an inclined surface like the inclined plate portion 111. The middle inclined plate portion 112 extends from an outer end portion of the inclined plate portion 111 toward the outer side of the passenger compartment, and is inclined upward on the outer side of the passenger compartment. The middle inclined plate portion 112 has a stronger inclination angle than the inclined plate portion 111. That is, an angle α between the inclined plate portion 111 and the horizontal plane is smaller than an angle β between the middle inclined plate portion 112 and the horizontal plane.

The plate portion 113 extends from an outer end portion of the middle inclined plate portion 112 toward the outer side of the passenger compartment. The plate portion 113 can be also inclined upward on the outer side of the passenger compartment, but the plate portion 113 has a smaller inclination angle with respect to the horizontal plane than the inclined plate portion 111 and the middle inclined plate portion 112. The angle α and the angle β can be set to any angle as long as the plate portion 113 is located above the inclined plate portion 111, and a step is formed between the plate portion 113 and the inclined plate portion 111 so that the inclined plate portion 111 is located below the plate portion 113. The plate portion 113 can have a double-folded plate structure as shown in the figure, and also can have a single plate structure.

The trim strip member 120 includes a fixed plate portion 121 fixed to the door frame body 110, and an outer plate portion 122 arranged to face the outer side of the passenger compartment. The fixed plate portion 121 is integrated with the outer plate portion 122. The fixed plate portion 121 extends along an upper surface of the plate portion 113 of the door frame body 110; and includes a middle plate portion 123 fixed to the upper surface of the plate portion 113, a protruding portion 124, and a connecting plate portion 125 connected to the outer plate portion 122. The middle plate portion 123 is fixed to the upper surface of the plate portion 113 by a rattle-free fixing method such as welding, riveting, or the like. Thus, relative misalignment is reduced between the trim strip member 120 and the door frame body 110.

The protruding portion 124 protrudes upward from the inner side of the passenger compartment of the middle plate portion 123, i.e., from the inner side of the passenger compartment of the trim strip member 120. The protruding portion 124 protrudes toward the outside of the door frame 105. In this embodiment, the protruding direction of the protruding portion 124 is a direction substantially orthogonal to the upper surface of the plate portion 113. Alternatively, the protruding direction of the protruding portion 124 may intersect with the upper surface of the plate portion 113.

The connecting plate portion 125 extends upward from the outer side of the passenger compartment of the middle plate portion 123. The connecting plate portion 125 includes an upper end portion, a vertically middle portion, and a lower end portion. The vertically middle portion is bent toward the outer side of the passenger compartment, and located on an outer side of the passenger compartment than the upper end portion and the lower end portion. Accordingly, the connecting plate portion 125 contains a recessed portion 125a that opens toward the inner side of the passenger compartment. The upper end portion of the connection plate portion 125 is connected to the upper end portion of the outer plate portion 122. The outer plate portion 122 extends downward from the portion connecting with the connecting plate portion 125. This outer plate portion 122 includes an outer surface of the passenger compartment, and this outer surface serves as an appearance of the automobile 100.

(Configuration of Weather Strip 10)

The weather strip 10 shown in FIG. 2 is provided on a peripheral edge portion of the door 101 of the automobile 100, and is a door weather strip made of an elastic material and sealing a gap between the peripheral edge portion of the door 101 and the peripheral edge portion of the opening portion 103 of the vehicle body 102. This weather strip 10 has a substantially linear shape continuous on the peripheral edge portion of the door frame 105 of the door 101 from the roof portion 102a of the vehicle body 102 to the door mirror vicinity portion 102b. In this embodiment, the attachment structure for attaching an upper portion of the weather strip 10 to the door frame 105 will be described in detail.

A structure for attaching a lower portion of the weather strip 10 to the door body portion 106 is typically known, and thus the detailed description thereof is omitted.

The weather strip 10 includes at least a hollow seal portion 11 and an attachment base portion 12, and is a member formed by integrating the hollow seal portion 11 and the attachment base portion 12. In this embodiment, a coupling plate portion 13 is provided between the hollow seal portion 11 and the attachment base portion 12.

When the door 101 is in the closed state, the hollow seal portion 11 comes into contact with the peripheral edge portion of the opening portion 103 of the vehicle body 102 and is elastically deformed as shown in FIGS. 2 and 4 to seal the gap between the peripheral edge portion of the door 101 and the peripheral edge portion of the opening portion 103 of the vehicle body 102. The hollow seal portion 11 may have any cross sectional shape such as a circular shape, an elliptical shape, or the like, in addition to a substantially rectangular shape shown in the figure. FIG. 2 is a cross section corresponding to the roof portion 102a, and FIG. 4 is a cross section corresponding to the door mirror vicinity portion 102b. As shown in these figures, when the door 101 is in the closed state, the hollow seal portion 11 in the elastically deformed state has the different cross sectional shapes depending on the portions. That is, the roof portion 102a and the door mirror vicinity portion 102b have different magnitudes and directions of the force acting on the hollow seal portion 11.

A double-sided adhesive tape T (a sticking material) is provided on a surface 11a of the hollow seal portion 11 closer to the door frame 105. The double-sided adhesive tape T may be a typically used tape, and can be stuck on the surface 11a of the hollow seal part 11 in advance. Instead of the double-sided adhesive tape T, various adhesive materials or the like can be used.

A raised portion 11b protruding downward is formed on the surface 11a of the hollow seal portion 11 on the inner side of the passenger compartment. The raised portion 11b is located on an inner side of the passenger compartment than the double-sided adhesive tape T. The raised portion 11b can cover a surface of the double-sided adhesive tape T on the inner side of the passenger compartment. The raised portion 11b have a protruding height which is set so as not to inhibit the adhesion of the hollow seal portion 11 by the double-sided adhesive tape T. A member shown by a reference character A in FIG. 2, etc. is a resin member called a garnish formed to cover the inner side of the passenger compartment of the door frame 105.

The attachment base portion 12 is a portion disposed on an outer side of the passenger compartment than the hollow seal portion 11. This attachment base portion 12 includes a seal lip portion 12a. The seal lip portion 12a is disposed on an outer side of the passenger compartment of the hollow seal portion 11, and is elastically deformed by coming into contact with the peripheral edge portion of the opening portion 103 of the vehicle body 102 on an outer side of the passenger compartment than the hollow seal portion 11. The seal lip portion 12a is elastically deformed by coming into contact with the peripheral edge portion of the opening portion 103 of the vehicle body 102 to seal the gap between the peripheral edge portion of the door 101 and the peripheral edge portion of the opening portion 103 of the vehicle body 102. The seal lip portion 12a protrudes upward, and is inclined such that the higher it goes, the further outside of the passenger compartment it is located.

The coupling plate portion 13 coupling the hollow seal portion 11 and the attachment base portion 12 is provided between the hollow seal portion 11 and the attachment base portion 12. The coupling plate portion 13 extends upward from an end portion of the outer side of the passenger compartment of the hollow seal portion 11 and along the middle inclined plate portion 112 of the door frame body 110. The coupling plate portion 13 includes an upper end portion continuous with the attachment base portion 12. As such, the coupling plate portion 13 is inclined, and thus the attachment base portion 12 is can be disposed above a lower wall portion of the hollow seal portion 11. Thus, the weather strip 10 can have a cross-sectional shape corresponding to the shape of the step of the door frame body 110. The attachment base portion 12 has a plate shape extending along the middle plate portion 123 of the trim strip member 120 and toward the outer side of the passenger compartment.

The coupling plate portion 13 and the attachment base portion 12 have a two-layer structure having a foamed portion 14 composed of a foamed material and a solid portion 15 composed of a non-foamed solid material. That is, a boundary surface of the materials (a boundary surface between the foamed portion 14 and the solid portion 15) is present at a middle portion in the thickness direction between the coupling plate portion 13 and the attachment base portion 12, and this boundary surface is denoted by a reference character L. The lower side below the boundary surface L is the solid part 15, and the upper side above the boundary surface L is the foamed part 14. Both the foamed part 14 and the solid part 15 can be made of an elastic material such as EPDM (ethylene propylene diene rubber), TPO (olefinic thermoplastic elastomer), or the like, and the foamed part 14 and the solid part 15 can be made of different materials. The solid portion 15 is solider than the foamed portion 14. Note that a foamed material may be used instead of the solid part 15. In this case, the expansion ratio is set so that the foamed material as the solid part 15 is solider than the foamed part 14.

The seal lip portion 12a is integrated with the foamed portion 14, and composed of a foamed material. The foamed portion 14 is continuous with the hollow seal portion 11, and the hollow seal portion 11 is also composed of a foamed material. Note that a thin skin layer can be formed on a surface of the foamed material. A coating can be adhered to a surface of the foamed portion 14. It is preferable that air bubbles are present on the surface of the foamed portion 14 because the coating is less likely to peel off.

The boundary surface L is located above the middle portion in the thickness direction between the coupling plate portion 13 and the attachment base portion 12, and thus the solid portion 15 is thicker than the foamed portion 14. The attachment base portion 12 is provided with an fitting portion 12c fitted onto the protruding portion 124 of the door frame 105. The fitting portion 12c can be a groove or a recessed portion into which the protruding portion 124 is inserted. The fitting portion 12c is provided in a portion composed of the solid portion 15 of the attachment base portion 12, i.e., is provided in a portion composed of a solider material than the seal lip portion 12a. The protruding portion 124 of the door frame 105 is inserted into the fitting portion 12c composed of the solid material, and thus the attachment base portion 12 can be accurately positioned with respect to the door frame 105.

A deformation origin portion 16 serving as an origin of deformation of the weather strip 10 is provided between the hollow seal portion 11 and the attachment base portion 12 of the weather strip 10. The deformation origin portion 16 is thinner than the attachment base portion 12. The deformation origin portion 16 has a groove shape provided at a boundary portion between the hollow seal portion 11 and the connecting portion 13, and serves as a portion for easily obliquely moving the hollow seal part 11 in the vertical direction in a state in which the attachment base part 12 is fixed, for example. In addition to the groove, the deformation origin portion 16 may be composed of, e.g., a hole, a portion composed of a softer material than the attachment base portion 12, a material boundary surface, or the like.

The attachment base portion 12 is provided with an engaging portion 12d engaging with the door frame 105 on an outer side of the passenger compartment than the fitting portion 12c. The engaging portion 12d protrudes toward the outer side of the passenger compartment, reaches the inside of the recessed portion 125a of the trim strip member 120, and is hitched on and engages with an inner surface of the recessed portion 125a. The engaging portion 12d includes a portion, i.e., the solid portion 15, composed of a solider material than the seal lip portion 12a. Thus, the engaging portion 12d is engaged with the inner surface of the recessed portion 125a, and is less likely to be detached from the recessed portion 125a.

(Attachment Procedure of Weather Strip 10)

Figure 6:
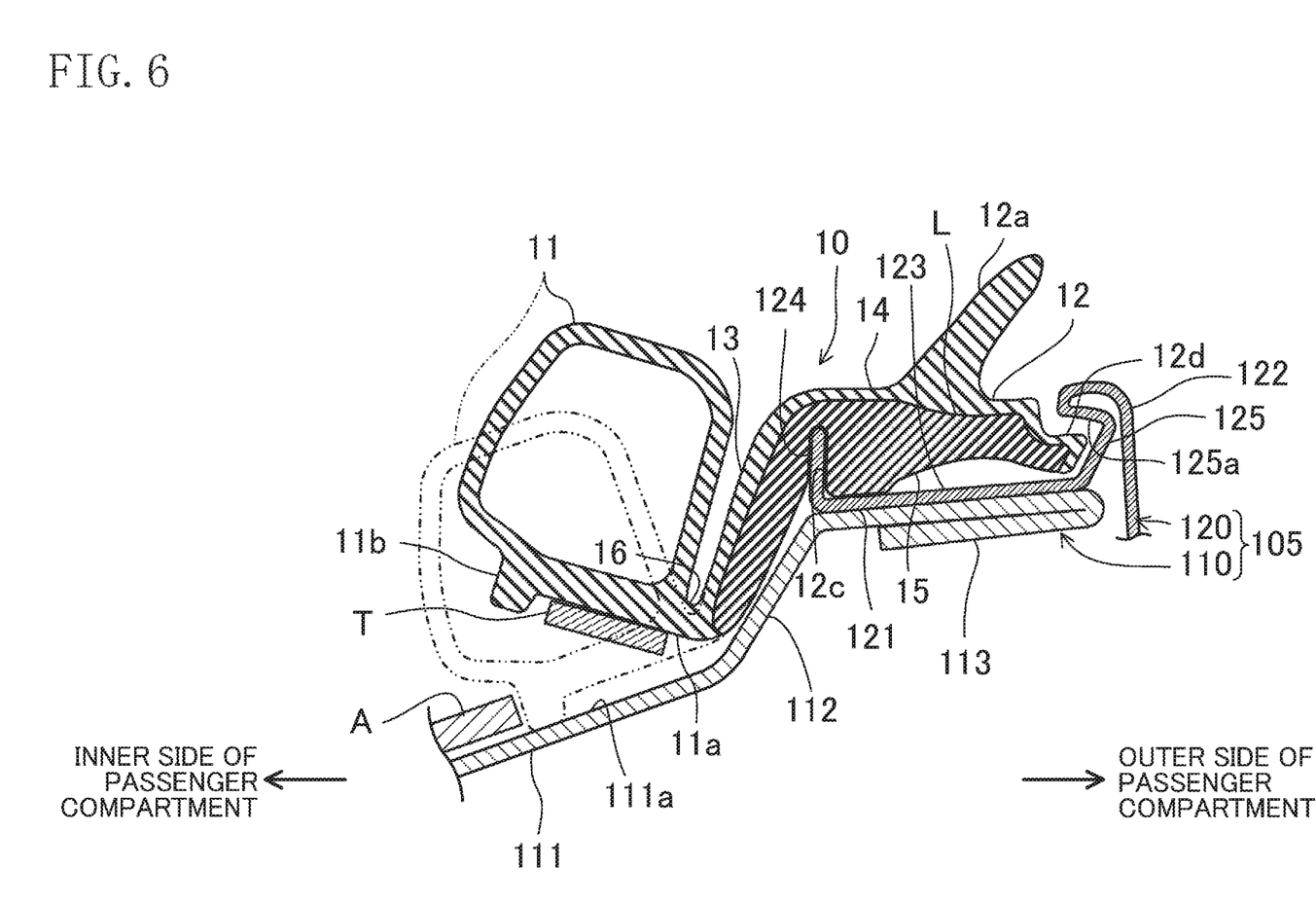
FIG. 6 is a cross-sectional view for describing an attachment procedure of a weather strip.

Next, the attachment procedure of attaching the weather strip 10 configured as described above to the door frame 105 will be described with reference to FIG. 6. First, the double-sided adhesive tape T is stuck to the surface 11a, closer to the door frame 105, of the hollow seal portion 11 of the weather strip 10. Then, the protruding portion 124 of the door frame 105 is inserted into the fitting portion 12c of the attachment base portion 12 of the weather strip 10 such that the fitting portion 12c is fitted to the protruding portion 124. The engaging portion 12d is placed in the recessed portion 125a such that the engaging portion 12d can engage with the inner surface of the recessed portion 125a.

The fitting portion 12c is fitted to the protruding portion 124 such that the attachment base portion 12 can be positioned with respect to the door frame 105. At this time, the fitting portion 12c is formed on the solid portion 15 solider than the seal lip portion 12a. Thus, the fitting portion 12c engaged with the projecting portion 124 is less likely to be elastically deformed, and the deformation of the fitting portion 12c is reduced such that the attachment base portion 12 is more accurately positioned with respect to the door frame 105. Thus, the meandering of the weather strip 1 in the attached state is reduced. Thus, the appearance is improved and the sealing property is improved.

After the attachment base portion 12 is positioned on the door frame 105, the hollow seal portion 11 is inclined upward with the deformation origin portion 16 as an origin point. Even if the fitting portion 12c of the attachment base portion 12 is solid, the deformation origin portion 16 enables the hollow seal portion 11 to be easily displaced in a reverse direction with respect to the door frame 105 in a state in which the attachment base portion 12 is positioned. Thus, a release paper of the double-sided adhesive tape T can be easily peeled off. Then, after the release paper is peeled off, the hollow seal portion 11 is moved toward the door frame 105 so that the double-sided adhesive tape T is stuck to the sticking surface 111a of the door frame 105. Accordingly, the hollow seal portion 11 is attached to the door frame 105.

Advantages of Embodiment

As described above, according to this embodiment, the hollow seal part 11 is integrated with the attachment base part 12 having the seal lip part 12a, and thus the number of parts of the weather strip 10 can be reduced. Then, the fitting portion 12c of the attachment base portion 12 fitted to the protruding portion 124 of the door frame 105 is solider than the seal lip portion 12a, and thus the accuracy of the attachment position of the weather strip 10 can be increased. Further, the deformation origin portion 16 is provided between the hollow seal portion 11 and the attachment base portion 12. Thus, even if the fitting portion 12c of the attachment base portion 12 is solid, the operation of sticking the hollow seal portion 11 to the sticking surface 111a of the door frame 105 though the double-sided adhesive tape T can be facilitated. Thus, the workability of attachment of the weather strip 10 can be improved.

The protruding portion 124 is provided on the trim strip member 120 fixed to the door frame body 110. Thus, the fitting portion 12c of the attachment base portion 12 of the weather strip 10 can be fitted to the trim strip member 120 which enhances the design of the door frame 105.

The fitting portion 12c of the attachment base portion 12 is configured as a groove, and the protruding portion 124 protrudes from the inner side of the passenger compartment of the trim strip member 120 toward the outside of the door frame 105. Thus, the protruding portion 124 being inserted into the fitting portion 12c of the attachment base portion 12 is less likely to come off from the fitting portion 12c, and the fitted state can be maintained.

The deformation origin portion 16 is thinner than the attachment base portion 12. Thus, the deformation origin portion 16 can be easily formed, and the hollow seal portion 11 can be displaced with respect to the attachment base portion 12 with a small force.

The seal lip portion 12a is composed of a foamed material, thereby being light and flexible. Further, the fitting portion 12c is composed of a solid material and thus is less likely to be elastically deformed. Thus, the accuracy of positioning of the attachment base portion 12 can be improved.

The engaging portion 12d engaging with the door frame 105 is provided on an outer side of the passenger compartment than the fitting portion 12c, and this engaging portion 12d includes a portion composed of a solider material than the seal lip portion 12a. Thus, the outer side of the passenger compartment of the attachment base portion 12 can be reliably engaged with the door frame 105.

The embodiment described above is a mere example in every respect, and shall not be interpreted in a limited manner. Furthermore, any variations or modifications falling within the range of equivalents to the claims are all encompassed within the scope of the present disclosure.

As described above, the present invention can be applied to, e.g., a weather strip attached to a door of an automobile.

What is claimed is:

1. A structure of attaching a weather strip for a door to a door frame of an automobile,
the weather strip
being provided on a peripheral edge portion of the door of the automobile, and
made of an elastic material and sealing a gap between the peripheral edge portion of the door and a peripheral edge portion of an opening portion of a vehicle body,
wherein
the weather strip is formed by integrating a hollow seal portion and an attachment base portion together,
the hollow seal portion
being elastically deformed by coming into contact with the peripheral edge portion of the opening portion of the vehicle body, and
the attachment base portion
including a seal lip portion disposed on an outer side of a passenger compartment of the hollow seal portion and elastically deformed by coming into contact with the peripheral edge portion of the opening portion of the vehicle body on an outer side of the passenger compartment than the hollow seal portion, and
being disposed on an outer side of the passenger compartment than the hollow seal portion,
a sticking material is provided on a surface of the hollow seal portion closer to the door frame,
the door frame includes a sticking surface on which the sticking material is stuck, and a protruding portion protruding and provided on an outer side of the passenger compartment than the sticking surface,
the attachment base portion includes a portion composed of a solider material than the seal lip portion,
the solider portion includes a fitting portion fitted to the protruding portion, and
a deformation origin portion serving as an origin of deformation is provided between the hollow seal portion and the attachment base portion of the weather strip.

2. The structure of attaching the weather strip of claim 1, wherein
the door frame includes a door frame body and a trim strip member fixed to the door frame body and extending along the door frame body, and
the protruding portion is provided on the trim strip member.

3. The structure of attaching the weather strip of claim 2, wherein
the fitting portion of the attachment base portion is a groove into which the protruding portion is inserted, and
the protruding portion protrudes from an inner side of the passenger compartment of the trim strip member toward an outside of the door frame.

4. The structure of attaching the weather strip of claim 1, wherein
the deformation origin portion is thinner than the attachment base portion.

5. The structure of attaching the weather strip of claim 1, wherein
the seal lip portion is composed of a foamed material, and the fitting portion is composed of a non-foamed material.

6. The structure of attaching the weather strip of claim 1, wherein
the attachment base portion is provided with an engaging portion engaging with the door frame on an outer side of the passenger compartment than the fitting portion, and the engaging portion includes a portion composed of a solider material than the seal lip portion.

* * * * *